(12) United States Patent
Whitt

(10) Patent No.: US 7,082,522 B2
(45) Date of Patent: Jul. 25, 2006

(54) METHOD AND/OR APPARATUS FOR IMPLEMENTING ENHANCED DEVICE IDENTIFICATION

(75) Inventor: Jeffrey K. Whitt, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 525 days.

(21) Appl. No.: 10/191,634

(22) Filed: Jul. 9, 2002

(65) Prior Publication Data

US 2004/0010678 A1    Jan. 15, 2004

(51) Int. Cl.
*G06F 9/24*    (2006.01)

(52) U.S. Cl. ................ 713/1; 713/2; 713/100
(58) Field of Classification Search ........... 713/100, 713/2, 1
See application file for complete search history.

(56) References Cited

U.S. PATENT DOCUMENTS

| | | | |
|---|---|---|---|
| 5,781,793 A * | 7/1998 | Larvoire et al. | 712/37 |
| 6,078,402 A * | 6/2000 | Fischer et al. | 358/1.16 |
| 6,209,043 B1 * | 3/2001 | Sanemitsu | 710/5 |
| 6,425,079 B1 * | 7/2002 | Mahmoud | 713/2 |
| 6,513,085 B1 * | 1/2003 | Gugel et al. | 710/305 |
| 6,560,702 B1 * | 5/2003 | Gharda et al. | 713/2 |
| 6,631,453 B1 * | 10/2003 | Friday | 711/163 |
| 6,665,778 B1 * | 12/2003 | Assaf | 711/156 |
| 6,751,686 B1 * | 6/2004 | Takasugi et al. | 710/52 |
| 6,754,895 B1 * | 6/2004 | Bartel et al. | 717/171 |
| 6,769,087 B1 * | 7/2004 | Moro et al. | 714/763 |
| 6,813,682 B1 * | 11/2004 | Bress et al. | 711/112 |
| 6,829,672 B1 * | 12/2004 | Deng et al. | 711/103 |
| 6,859,856 B1 * | 2/2005 | Piau et al. | 711/103 |
| 6,873,584 B1 * | 3/2005 | Imada et al. | 369/53.16 |
| 2002/0064081 A1 * | 5/2002 | Tzeng et al. | 365/230.06 |

* cited by examiner

*Primary Examiner*—Thomas C. Lee
*Assistant Examiner*—Vincent Tran
(74) *Attorney, Agent, or Firm*—Christopher P. Maiorana PC

(57) ABSTRACT

An apparatus comprising a first circuit, a second circuit and a third circuit. The first circuit may be configured to present device information in response to one or more externally generated signals. The second circuit may be configured to store the device information. The third circuit may have (i) a first mode configured to program the device information into the second circuit and (ii) a second mode configured to transfer the device information from the second circuit to the first circuit.

20 Claims, 3 Drawing Sheets

METHOD AND/OR APPARATUS FOR IMPLEMENTING ENHANCED DEVICE IDENTIFICATION

FIELD OF THE INVENTION

The present invention relates to a method and/or apparatus for implementing controllers generally and, more particularly, to a method and/or apparatus for implementing enhanced device identification in a controller.

BACKGROUND OF THE INVENTION

Conventional protocol controllers often implement some form of software device identification. For example, the Peripheral Connect Interface (PCI) bus protocol provides two 16-bit identification fields called Vendor ID and Device ID. Software drivers access these fields to identify which hardware devices to control.

In a conventional protocol chip, the identification fields are hardwired. The conventional methodology calls for the identification fields to be updated any time a functional change is made to the chip. Updating the fields each time a functional change is made can potentially cause a problem because the functional change can involve mask layers that are not used for generating the identification information.

It would be desirable to implement identification fields that may be updated by software.

SUMMARY OF THE INVENTION

The present invention concerns an apparatus comprising a first circuit, a second circuit and a third circuit. The first circuit may be configured to present device information in response to one or more externally generated signals. The second circuit may be configured to store the device information. The third circuit may have (i) a first mode configured to program the device information into the second circuit and (ii) a second mode configured to transfer the device information from the second circuit to the first circuit.

The objects, features and advantages of the present invention include providing a method and/or apparatus for implementing enhanced device identification that may (i) implement identification fields that can be updated by software, (ii) provide on chip memory and firmware for updating and storing start of day (SOD) information and device identification fields, (iii) allow changes in identification fields without costly mask changes, (iv) replace or eliminate external devices for updating internal identifiers and/or (v) allow firmware to internally store permanent and semi-permanent information at any time.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
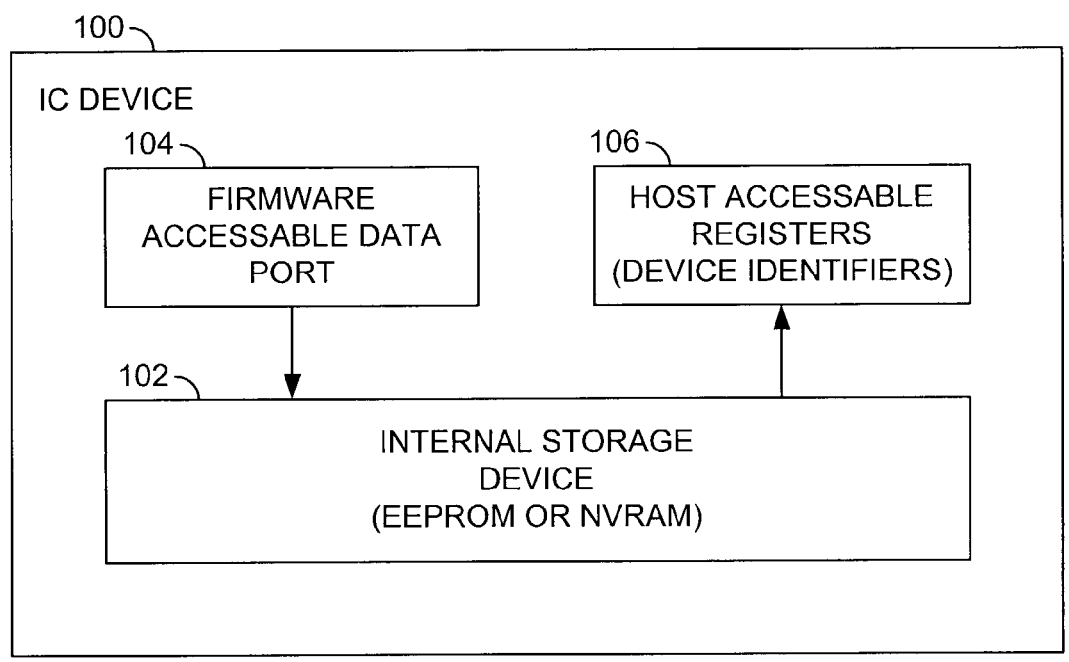
FIG. 1 is a block diagram of a preferred embodiment of the present invention.

Referring to FIG. 1, a block diagram of a circuit 100 is shown in accordance with a preferred embodiment of the present invention. The circuit 100 is generally implemented as a single integrated circuit (or chip). The circuit 100 may be implemented, in one example, as a protocol controller. The circuit 100 generally comprises a block (or circuit) 102, a block (or circuit) 104, and a block (or circuit) 106. The circuit 102 may be implemented as an on-chip storage device. The circuit 102 may comprise, in one example, a non-volatile memory (e.g., EEPROM, NVRAM, etc.). However, other types of memory may be implemented accordingly to meet the design criteria of a particular implementation. The circuit 102 generally replaces external devices (e.g., external EEPROM that are read at power-up) that are used in conventional approaches to update internal identifiers (e.g., start of day (SOD) information).

The circuit 104 may comprise firmware that may be configured to update, in one example, one or more device identification fields of the circuit 100. The device identification fields are generally updated with information contained within the memory 102. Such updating may allow changes to be made in the identification fields of the device 100 without costly mask changes to the IC device. The circuit 104 may also be configured to program (or update) information stored in the memory 102. For example, the circuit 104 may comprise firmware (i) containing the SOD information and/or register values and (ii) configured to program the SOD information and/or register values into the circuit 102. Alternatively, the firmware may be configured to accept SOD information and/or register values from external to the circuit 100 (e.g., from a host). The firmware may be further configured to store permanent and semi-permanent information in addition to the SOD information and register values in the memory 102.

The circuit 106 may be implemented, in one example, as one or more host accessible registers. The circuit 106 may be configured to present device identifiers in response to a request from the host (e.g., a request generated by a software driver). In one example, the circuit 104 may be configured to update (or program) the device identifiers in the circuit 106 from information stored in the memory 102. In another example, the circuit 106 may be configured to retrieve device identifiers from the circuit 102 and present the retrieved identifiers to the host.

Figure 2:
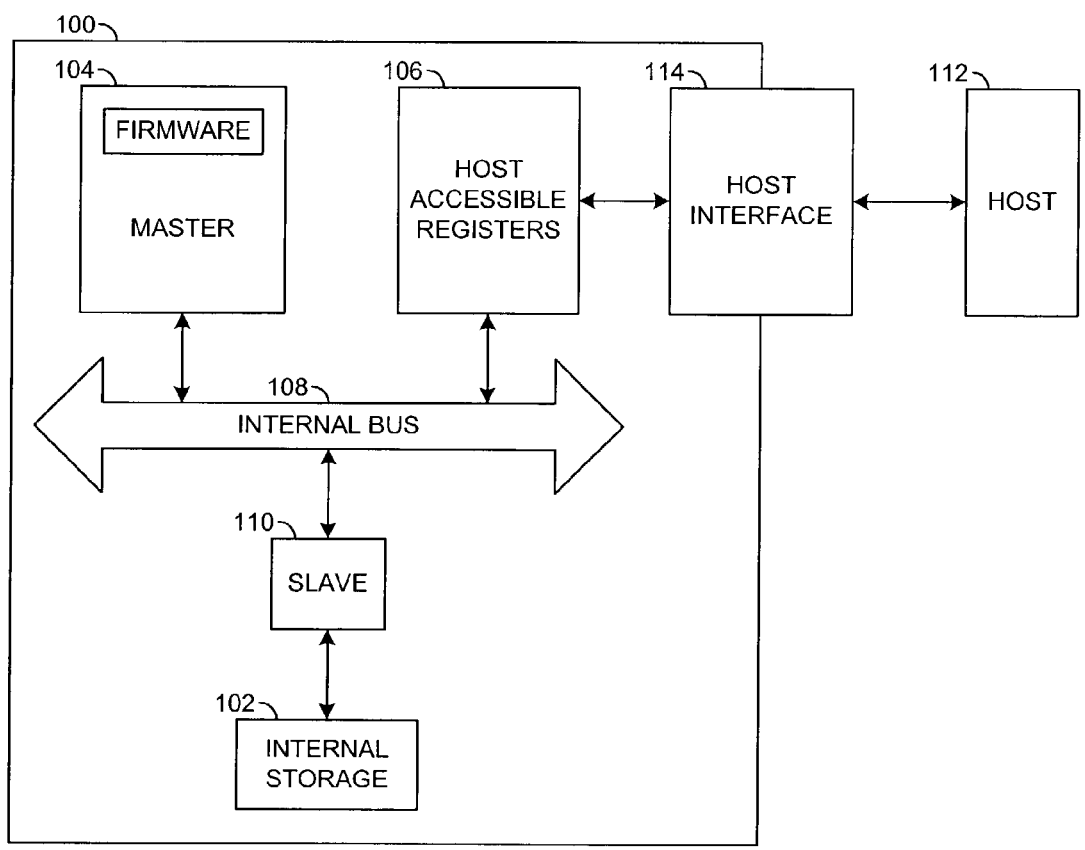
FIG. 2 is a more detailed block diagram of a preferred embodiment of the present invention.

Referring to FIG. 2, a more detailed block diagram of the circuit 100 of FIG. 1 is shown. In one example, the circuits 102, 104 and 106 may be coupled by an internal bus 108. The internal bus 108 may be implemented, in one example, as an AHB bus. However, other appropriate busses may be implemented accordingly to meet the design criteria of a particular application. In one example, the circuit 102 may be coupled to the bus 108 via a circuit 110. The circuit 110 may be implemented, in one example, as an AHB slave device. The circuit 104 may be implemented, in one example, as an AHB master device. However, other types of devices may be implemented accordingly to meet the design criteria of a particular application.

The circuit 104 (e.g., the master device) generally communicates with the circuit 110 (e.g., the slave device) to store information in and/or retrieve information from the memory 102. When the information is retrieved, the circuit 104 or the circuit 110 may be configured to route the information to the circuit 106 via the bus 108. The circuit 106 may be configured to present the retrieved information to a host device 112 via, in one example, an interface 114. The interface 114 may be implemented, in one example, as a PCI interface. However, other types of interfaces may be implemented accordingly to meet the design criteria of a particular application.

Figure 3:
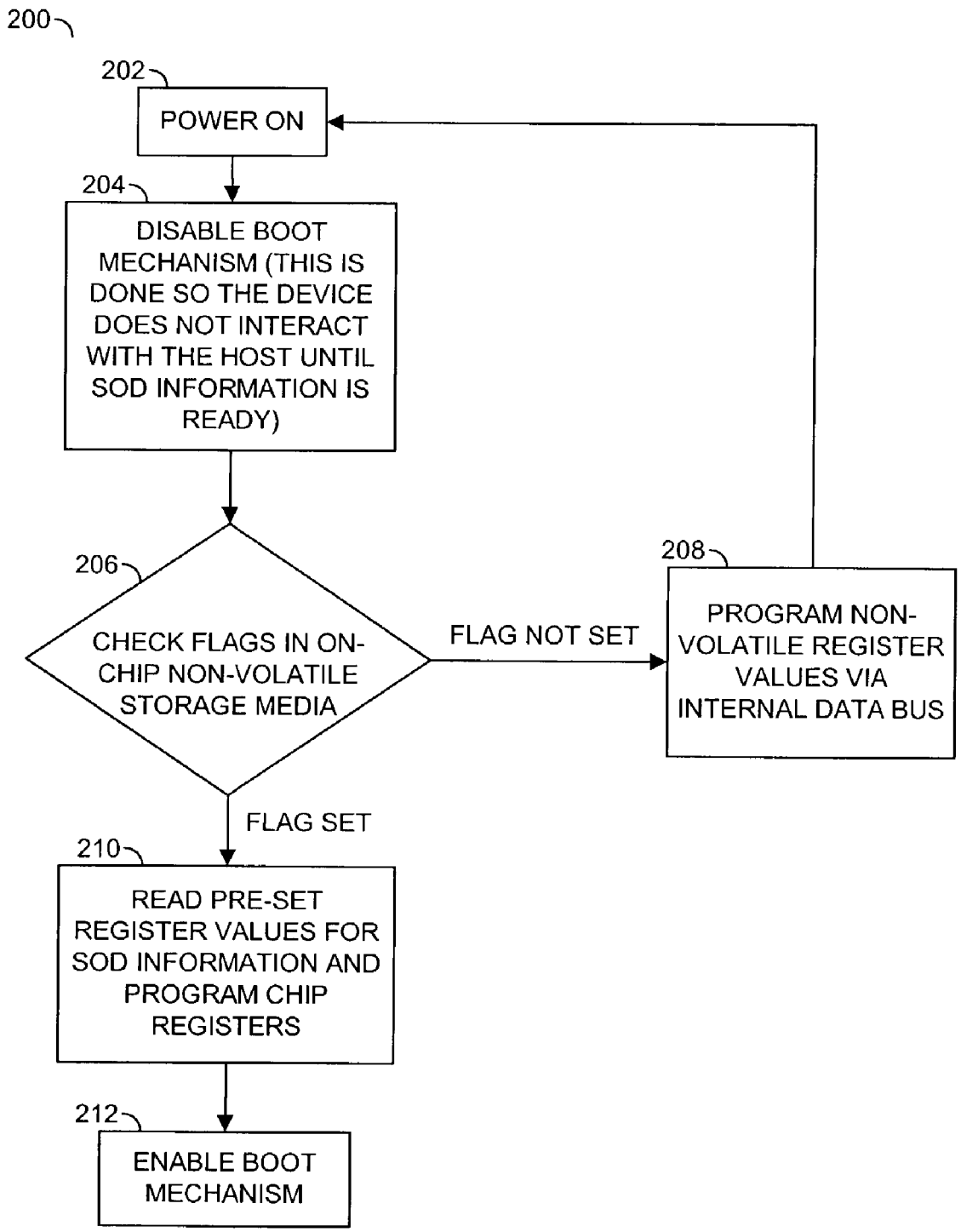
FIG. 3 is a flow diagram of an example operation in accordance with a preferred embodiment of the present invention.

Referring to FIG. 3, a flow diagram 200 is shown illustrating an example operation in accordance with a preferred embodiment of the present invention. Following power-on of a device incorporating the present invention (e.g., the block 202), communication with the host device may be suspended. For example, a boot mechanism of the device 100 may be disabled (e.g., the block 204). In general, the boot mechanism may be disabled to allow time for initialization of the device 100. For example, start of day (SOD) information and/or device identifiers of the device 100 may be initialized from the internal memory 102 (e.g., the block 204).

In one example, the circuit 102 may comprise an on-chip, non-volatile storage media with one or more flags. The one or more flags may be configured to indicate whether the circuit 102 has been programmed with SOD information and/or device identifiers. Firmware may be configured to check the flags (e.g., the block 206). When the flags are in a first state (e.g., not set), the firmware may be configured to program SOD information and internal register values (e.g., device identifiers) into the circuit 102 via the internal data bus 108 (e.g., the block 208). The SOD information and internal register values to be programmed may be contained, in one example, within the firmware. Alternatively, the firmware may be configured to accept the information from the host driver. When the flags are in a second state (e.g., set), the firmware may be configured to read the register values from the circuit 102 and program SOD information and/or registers of the chip 100 (e.g., the block 210). Once the start of day information and/or registers have been initialized (or updated), the boot mechanism may be enabled (e.g., the block 212).

The various signals of the present invention are generally "on" (e.g., a digital HIGH, or 1) or "off" (e.g., a digital LOW, or 0). However, the particular polarities of the on (e.g., asserted or set) and off (e.g., de-asserted or not set) states of the signals may be adjusted (e.g., reversed) accordingly to meet the design criteria of a particular implementation. Additionally, inverters may be added to change a particular polarity of the signals.

The function performed by the flow diagram of FIG. 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to present device information to an external device in response to one or more externally generated signals, wherein said device information comprises a chip identification field;
a second circuit configured to store said device information such that said device information is non-volatile; and
a third circuit having (i) a first mode configured to program said device information into said second circuit and (ii) a second mode configured to transfer said device information from said second circuit to said first circuit, wherein (i) said first circuit, said second circuit and said third circuit are part of a single integrated circuit and (ii) said device information is updated by executing firmware in said integrated circuit.

2. The apparatus according to claim 1, wherein said single integrated circuit comprises a protocol controller.

3. The apparatus according to claim 1, wherein said first circuit comprises one or more externally accessible registers.

4. The apparatus according to claim 1, wherein said second circuit comprises a non-volatile storage device.

5. The apparatus according to claim 4, wherein said non-volatile storage device comprises a non-volatile memory.

6. The apparatus according to claim 1, wherein said second circuit comprises an electrically erasable programmable read only memory.

7. The apparatus according to claim 1, wherein said second circuit comprises a non-volatile random access memory (NVRAN).

8. The apparatus according to claim 1, wherein said third circuit comprises a firmware accessible data port.

9. The apparatus according to claim 1, wherein said third circuit is configured to operate in response to one or more computer executable instructions.

10. The apparatus according to claim 9, wherein said computer executable instructions comprise said firmware.

11. The apparatus according to claim 1, wherein the mode of said third circuit is determined in response to information stored in said second circuit.

12. The apparatus according to claim 11, wherein said information comprises one or more flags.

13. The apparatus according to claim 1, wherein said device information further comprises start of day (SOD) information.

14. The apparatus according to claim 1, wherein said device information further comprises one or more internal device identifiers.

15. The apparatus according to claim 1, further comprising an internal bus coupling said first, second and third circuits.

16. The apparatus according to claim 15, wherein said second circuit is coupled to said bus via a slave device and said third circuit comprises a master device.

17. An apparatus comprising:
means for storing device information comprising a chip identification field, such that said device information is non-volatile;
means for programming said device information in said storage means; and
means for presenting said device information to an external device in response to one or more externally generated signals, wherein (i) said storing means, said programming means and said presenting means are part of a single integrated circuit and (ii) said device information is updated by executing firmware in said integrated circuit.

18. A method for providing enhanced device identification in an integrated circuit comprising the steps of:
storing device information in an internal non-volatile storage medium, wherein said device information stored in said internal non-volatile storage medium comprises a chip identification field and is updated by executing firmware in said integrated circuit;

programming one or more externally accessible registers of said integrated circuit using said stored device information; and presenting the contents of said one or more externally accessible registers to an external device in response to an external request.

19. The method according to claim 18, further comprising the steps of:

checking said internal non-volatile storage medium for said device information; and programming said device information into said internal non-volatile storage medium when not already present.

20. The method according to claim 18, further comprising the steps of:

disabling a boot mechanism in response to a power up; and enabling said boot mechanism when said device information is initialized.

* * * * *